(12) United States Patent
Channell, Sr. et al.

(10) Patent No.: US 8,776,365 B2
(45) Date of Patent: Jul. 15, 2014

(54) METHOD OF MANUFACTURING A TERMINAL BLOCK

(75) Inventors: William H. Channell, Sr., Murrieta, CA (US); Edward J. Burke, Temecula, CA (US)

(73) Assignee: Channell Commercial Corporation, Temecula, CA (US)

( * ) Notice: Subject to any disclaimer, the term of this patent is extended or adjusted under 35 U.S.C. 154(b) by 881 days.

(21) Appl. No.: 12/844,695

(22) Filed: Jul. 27, 2010

(65) Prior Publication Data

US 2010/0287769 A1 Nov. 18, 2010

Related U.S. Application Data

(62) Division of application No. 12/123,353, filed on May 19, 2008, now Pat. No. 7,762,853, which is a division of application No. 10/985,851, filed on Nov. 9, 2004, now Pat. No. 7,373,719.

(51) Int. Cl.
*H01R 43/00* (2006.01)
*H05K 13/00* (2006.01)

(52) U.S. Cl.
USPC ............ 29/854; 29/831; 29/841; 29/842; 29/858; 29/883; 264/271.1; 264/272.11; 439/393; 439/409; 439/417

(58) Field of Classification Search
USPC ........... 29/831, 837, 838, 841, 842, 846, 848, 29/854–858, 863, 883; 264/271.1, 272.11; 439/393, 409, 417
See application file for complete search history.

(56) References Cited

U.S. PATENT DOCUMENTS

| | | |
|---|---|---|
| 4,315,664 A | 2/1982 | Hughes et al. |
| 4,725,243 A | 2/1988 | Pretchel et al. |
| 4,946,390 A | 8/1990 | Smyers |
| 5,112,245 A | 5/1992 | Shimirak et al. |
| 5,182,032 A | 1/1993 | Dickie et al. |
| 5,399,100 A | 3/1995 | Dooley et al. |

(Continued)

FOREIGN PATENT DOCUMENTS

| | | |
|---|---|---|
| EP | 327330 | 8/1989 |
| GB | 2102635 | 2/1983 |

(Continued)

OTHER PUBLICATIONS

Examination Report issued in New Zealand Application No. 555042 dated Jun. 24, 2009.

*Primary Examiner* — Paul D Kim
(74) *Attorney, Agent, or Firm* — Buchanan Ingersoll & Rooney PC

(57) ABSTRACT

A method of manufacturing a terminal block for a telecommunication cable, which includes providing a housing having a front side and a back side and positioning multiple pairs of electrical connectors in the housing such that one end of each of the electrical connectors is exposed on the front side of the housing and one end of the connector is exposed on the back side of the housing. Each of electrical connectors having an insulation displacement contact terminal on the end exposed on the back side of the housing, and connecting multiple pairs of insulated electrical wires to the connectors on the back side of the housing. A dielectric material is pressure molded on the back side of the housing to encapsulate the connections of the wires and the connectors on the back side of the housing.

18 Claims, 8 Drawing Sheets

(56) References Cited

U.S. PATENT DOCUMENTS

| | | |
|---|---|---|
| 5,540,602 A | 7/1996 | Bell |
| 5,971,733 A | 10/1999 | Huang |
| 6,012,942 A * | 1/2000 | Volstorf .................. 439/397 |
| 6,015,312 A | 1/2000 | Escane |
| 6,089,924 A | 7/2000 | Wang |
| 6,171,140 B1 | 1/2001 | Anbo et al. |
| 6,173,488 B1 * | 1/2001 | Endo et al. .................. 29/747 |
| 6,193,556 B1 | 2/2001 | Escane |
| 6,196,862 B1 | 3/2001 | Dooley |
| 6,247,974 B1 | 6/2001 | Jenner et al. |
| 6,370,771 B1 | 4/2002 | Huang |
| 6,428,345 B2 | 8/2002 | Sawayanagi et al. |
| 6,428,357 B1 | 8/2002 | Dolinshek et al. |
| 6,434,820 B1 * | 8/2002 | Volstorf .................. 29/874 |
| 6,457,990 B1 | 10/2002 | Daoud |
| 6,517,374 B2 | 2/2003 | Maeda |
| 6,887,104 B2 | 5/2005 | Lee |
| 6,966,799 B1 | 11/2005 | Wang |
| 7,192,300 B2 | 3/2007 | Hashiguchi et al. |
| 7,309,252 B2 | 12/2007 | Fabian et al. |
| 2008/0295330 A1 | 12/2008 | Shimirak |

FOREIGN PATENT DOCUMENTS

| | | |
|---|---|---|
| GB | 2129630 | 5/1984 |
| GB | 2176062 | 12/1986 |
| GB | 2260036 | 3/1993 |
| GB | 2261773 | 5/1993 |
| GB | 2287367 | 9/1995 |
| GB | 2293699 | 4/1996 |
| GB | 2303500 | 2/1997 |
| GB | 2320144 | 6/1998 |

* cited by examiner

METHOD OF MANUFACTURING A TERMINAL BLOCK

This is a division of application Ser. No. 12/123,353 filed May 19, 2008, now U.S. Pat. No. 7,762,853, which is a division of application Ser. No. 10/985,851 filed Nov. 9, 2004, now U.S. Pat. No. 7,373,719.

FIELD OF THE INVENTION

This invention relates to integrally molded electrical blocks, and more particularly terminal blocks for use in the telecommunications industry and methods and processes for manufacturing such blocks.

BACKGROUND OF INVENTION

Terminal blocks are typically used in the telecommunications industry to connect multiple wire pairs, for example, to connect telephone service wires to telephone company distribution cables. Such terminal blocks typically connect from 2 to 50 individual service wire pairs to the distribution cable that may have several thousand-wire pairs. Generally, the terminal block is spliced to the distribution cable through a splicing cable or stub cable that forms part of the terminal block. The customer service wires are then connected to the terminal blocks through some type of terminal, which, ideally, enables the service wires to be easily connected, disconnected and reconnected on site.

In the telecommunications industry, a large number of wires connect the various component of the system through the terminal block. To organize the many wires, some telecommunications operators use color-coding on the wire jackets based on signal type, and channel number or program content.

Typically, telephone-wiring applications use a uniform scheme for dealing with a large number of wires for the telephone industry. The scheme uses two color codes—one for large numbers of wires organized in pairs and the other for smaller numbers of wires that also can be organized in pairs. For large number of wires, each pair is assigned a two-color code. The colors are selected from two groups of five, resulting in what is called a binder-group of 25 pairs. The colors used for a group are white, red, black, yellow and violet. The colors used for "pairs within a group" are blue, orange, green, brown and slate. Each pair must have a unique color combination. One wire within each pair has a solid background of its group color and stripes of the "pair within the group" color; the second wire has the colors reversed. Cables with more than 25 pairs of wires are constructed from 25-pair groups.

For small wiring groups, such as wires for an individual telephone station or terminal, a second color-code scheme can be used. The alternate color uses the first three pairs of the standard color code (white-blue, blue-white, and so on) or alternatively can use the six alternate color wires.

Originally, telecommunications terminals were optimized for use with copper drop wires. Through an evolutionary process, a plurality of different wire sizes and kinds of wire have been employed to connect the subscriber to the phone company. The gauges can vary from 18½ to 26 AWG gauge copper based wires some of which may have steel cores. Most common copper wires are between about 19-24 AWG gauge.

Traditionally, standard conventional terminals had an electrical connector secured in a suitable dielectric base material. The wires are stripped of their insulation, formed in a "C" shape, and connected to the electrical connector. After connecting the wires to the electrical connectors, a potting material is poured by hand over the electrical connectors and electrical wires. The potting process provides environmental and mechanical protection for the connections in the terminal blocks. This process is craft sensitive and time consuming.

Alternatively, the terminal block can be manufactured using insulation displacement contacts (IDC) or terminals, which cut through the wire insulation without requiring wire stripping. Although, the IDC partially addresses the time consuming installation problems, the process is still not only labor intensive but is also very time consuming. In addition, the IDC terminals require hand installation of the individual termination of the copper wires within the cable to the back of the terminal by hand and thereafter potting by hand.

Accordingly, there is a need for improvements including increased efficiency and increased flexibility over the handmade products made by labor intensive manufacturing processes that can be used for the production of an integrally molded terminal block for telecommunication cables, which eliminates the wrapping of wires by hand around the electrical connectors, and the hand poured gravity potting process.

SUMMARY OF THE INVENTION

This invention provides new and improved manufacturing methods and manufacturing apparatus for the production of an integrally molded electrical block including terminal blocks for the telecommunications industry.

In one aspect of the invention, a method of manufacturing a terminal block for a telecommunication cable comprises: providing a mold comprising: a first half and a second half, each forming a respective body cavity configured to form a terminal block and configured to receive a substrate comprising a plurality of openings adapted to receive an insulated electrical contact; and a plurality of projections extending from the first half into the cavity, wherein the plurality of projections are adapted to remove a portion of insulation from the electrical contact positioned within each of the openings; positioning the substrate in the mold; inserting the insulated electrical contact into each of the openings; closing the mold, such that the plurality of projections remove a portion of the insulation from the insulated electrical contact upon closing of the mold; injecting a dielectric material into the mold containing the substrate and insulated electrical contact to form a terminal block; and removing the terminal block from the mold, wherein the plurality of projections form a socket adapted to receive an electrical connector.

In a further aspect of the invention, a mold for manufacturing a terminal block for telecommunication cables comprises: a first half and a second half, each forming a respective body cavity configured to form a terminal block and configured to receive a substrate having a plurality of openings adapted to receive an insulated electrical contact; and a plurality of projections extending from the first half into the cavity, wherein the plurality of projections are adapted to remove a portion of insulation from the insulated electrical contact positioned within each of the openings.

In another aspect of the invention, a terminal block for a telecommunication cable comprises: a substrate, wherein the substrate comprises a plurality of openings adapted to receive an insulated electrical contact; an insulated electrical contact positioned within each of the plurality of openings; and a housing, wherein the housing surrounds the substrate and forms a socket adapted to receive an electrical connector.

In a further aspect of the invention, a method of manufacturing a terminal block for a telecommunication cable comprises: positioning a substrate in a mold, the substrate comprising a plurality of openings adapted to receive an insulated electrical wire; inserting an insulated electrical wire into each of the openings, wherein the openings receive a first end of the insulated electrical wire; cutting the insulated electrical wire at a second end to form a bundle of wires; closing the mold, such that the plurality of projections remove a portion of the insulation from the insulated electrical wire upon closing of the mold; injecting a dielectric material into the mold containing the substrate and insulated electrical wire to form a terminal block; removing the terminal block from the mold, wherein the projections form a socket adapted to receive an electrical connector; and inserting electrical connectors into the socket of the terminal block.

In one aspect of this invention, a terminal block for a telecommunication cable comprises: a housing having a front side and a back side and adapted for receiving the end of a cable comprising multiple pairs of insulated electrical wires; multiple electrical connectors, each having a first end and a second end and positioned in the housing and adapted to receive electrical wires at the first end in the back side of the housing and to receive electrical conductors in the front side of the housing; multiple pairs of electrical wires extending from the cable, wherein the electrical wires are connected to the first end of the electrical connector in the back side of the housing; and wherein the first ends of the electrical connectors and the multiple pairs of electrical wires connected thereto are embedded in a pressure molded dielectric material in the back side of the housing.

In another aspect of this invention, a method of manufacturing a terminal block for a telecommunication cable comprises: providing a housing having a front side and a back side and adapted for receiving the end of a cable comprising multiple pairs of electrical wires; positioning multiple pairs of electrical connectors in the housing such that one end of the connector is in the front side of the housing and one end of the housing is in the back side of the housing; connecting multiple pairs of insulated electrical wires to the connectors in the back side of the housing; pressure molding a dielectric material into the back side of the housing to encapsulate the connections of the wires and the connectors.

In a further aspect of this invention, a molded electrical block comprises: at least one electrical connector, the at least one electrical connector comprising a first end adapted to receive a first electrical wire and a second end adapted to receive a second electrical wire; at least one electrical wire connected to the first end of the at least one electrical connector; and a dielectric material injected by a force of greater than 1 g into a mold containing the at least one electrical connector and the at least one electrical wire, wherein the dielectric material surrounds at least the first end of the electrical connector and the at least one electrical wire.

In another aspect of this invention, method of manufacturing a terminal block for a telecommunication cable comprises: positioning at least one electrical connector in a mold, the at least one electrical connector comprising a first end adapted to receive a first electrical wire and a second end adapted to receive a second electrical wire; connecting at least one insulated electrical wire to the first end of each of the at least one electrical connectors; and injecting a dielectric material by a force of greater than 1 g into the mold containing the at least one electrical connector and the at least one electrical wire, wherein the dielectric material surrounds at least the first end of the electrical connector and the at least one electrical wire.

The above aspects of this invention are more fully explained in reference to the drawings and general disclosure herein.

BRIEF DESCRIPTION OF THE DRAWINGS

The invention will now be described in greater detail with reference to the preferred embodiments illustrated in the accompanying drawings, in which like elements bear like reference numerals, and wherein.

DESCRIPTION OF THE INVENTION

Although the traditionally manufactured electrical blocks including terminal blocks incorporating a potting compound is functional, it would be desirable to have a manufacturing process and system for an integrally molded terminal block for a telecommunication cable that is not labor intensive and does not require hand poured potting of the terminal block.

With reference to the drawings, the method and process for manufacturing a terminal block for a telecommunication cable according to the present invention will now be described.

Figure 1:
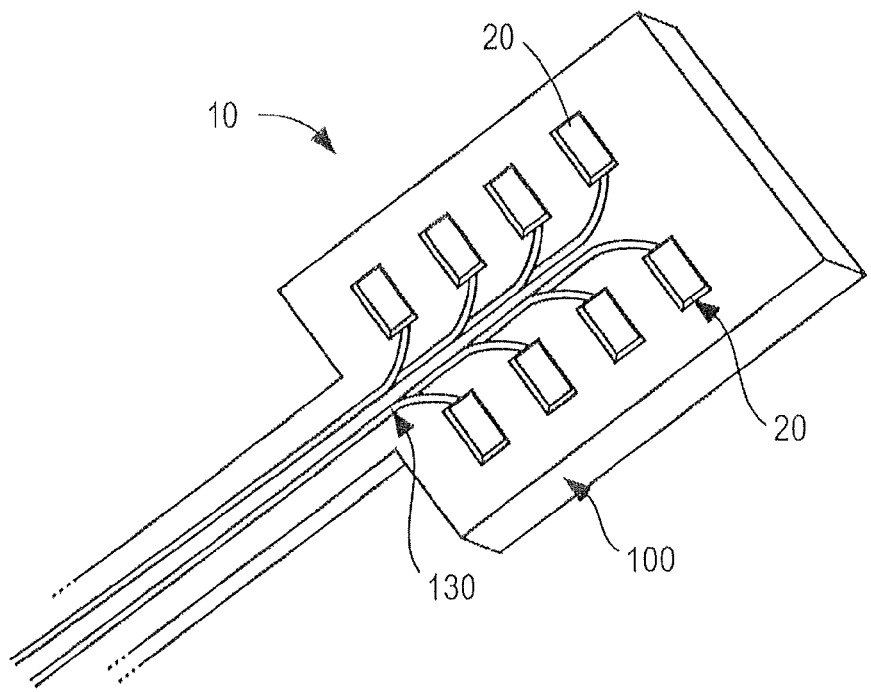
FIG. 1 shows a perspective view of an integrally molded terminal block for telecommunications cables.

FIG. 1 shows a perspective view of a terminal block 10 for telecommunications cables. The terminal block 10 comprises an integrally molded block 100 having at least one socket 120 (not shown) configured to receive an electrical connector 20. An electrical contact 130 (not shown) is molded into each of the at least one sockets 120 of the molded block 100.

Figure 2:
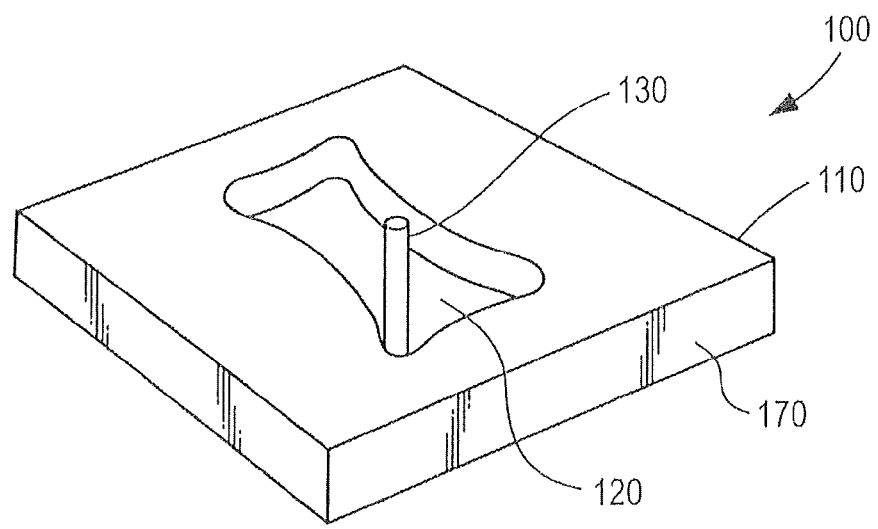
FIG. 2 shows a perspective view of an integrally molded block for telecommunications cables as shown in FIG. 1.

FIG. 2 shows a perspective view of a portion of the integrally molded block 100 of FIG. 1. The integrally molded block 100 comprises a socket 120 configured to receive an electrical connector 20 (not shown). The molded block 100 comprises a substrate 210 (FIG. 4) having at least one socket 120 configured to receive an electrical wire 130. The substrate 210 and electrical contact 130 are encased within an outer housing 170. The outer housing 170 forms an outer surface 110 of the molded block 100.

Figure 6:
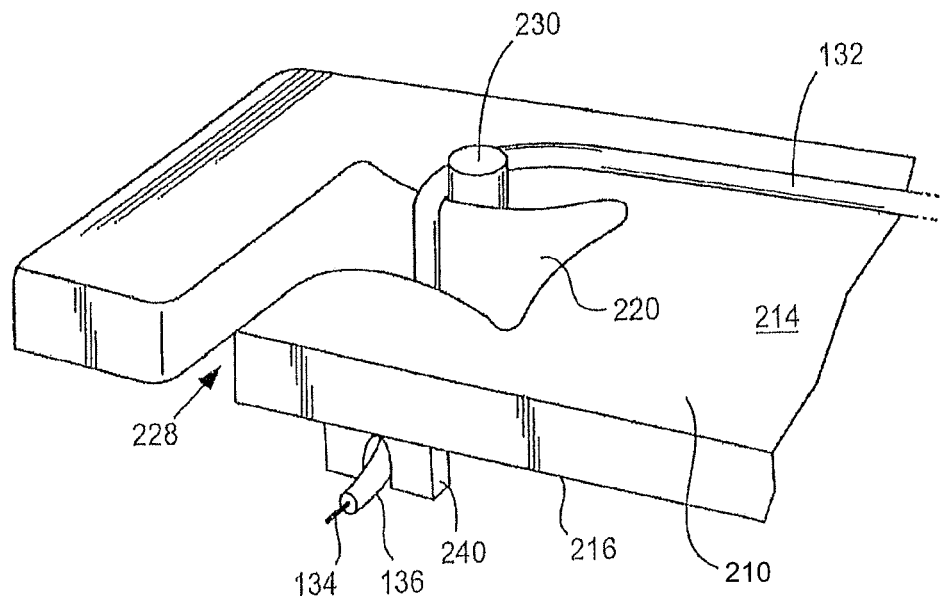
FIG. 6 shows a perspective view of a substrate for an integrally molded block wired with an electrical contact.

The socket 120 includes at least one electrical contact 130 preferably in the form of an electrical wire 132 (FIG. 6). The electrical wire 132 is preferably an insulated electrical wire as used in the telecommunication industry and more preferably a pair of insulated electrical wires as used in the telecommunications industry. However, it can be appreciated that the electrical contact 130 can be an electrical connector, such as an insulation displacement contact (IDC).

In one embodiment, a first end 133 of the electrical wire 132 forms the electrical contact 130 within the socket 120 of the terminal block 10. A second end 135 of the electrical wire 132 is gathered with other second ends 135 of other electrical wires 132 to form a bundle of wires 137 or cable. As known in the telecommunication industry, the bundle of wires 137 forms a pigtail of the terminal block 10. The electrical wire 132 is encased within the substrate 210 of the molded block 100.

Figure 3:
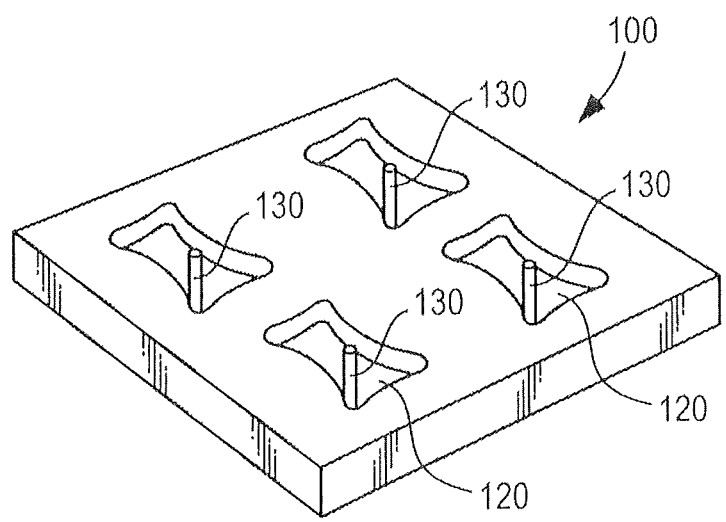
FIG. 3 shows a perspective view of an integrally molded block for telecommunications cables as shown in FIG. 1 having a plurality of sockets configured to receive electrical connectors.

FIG. 3 shows a perspective view of an integrally molded block 100 for telecommunications cables as shown in FIG. 1. The molded block 100 as shown in FIG. 3 has a plurality of socket 120 configured to receive an electrical connector 20. Each of the sockets 120 include at least one electrical contact 130.

Figure 4:
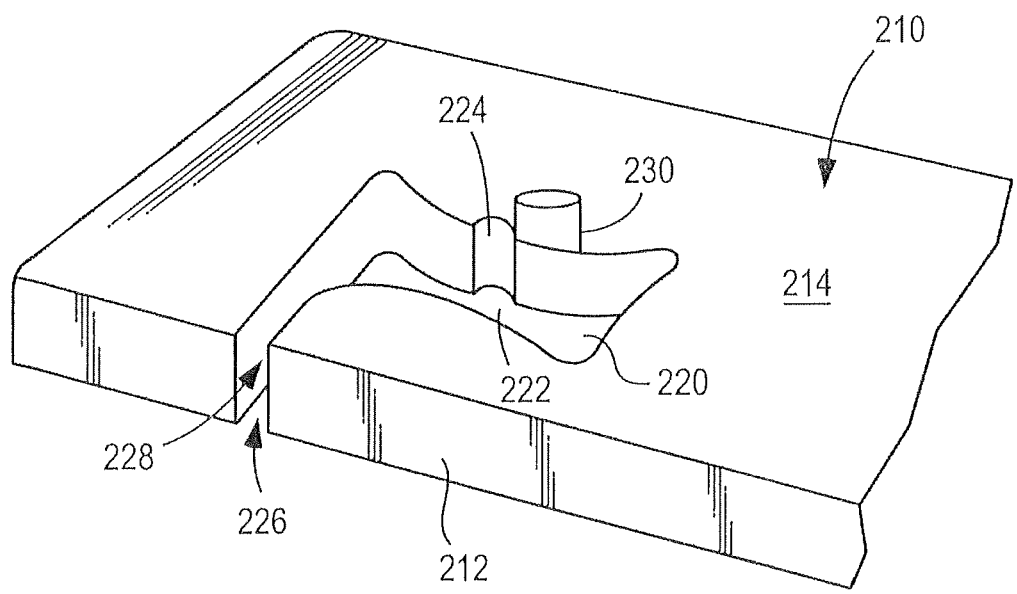
FIG. 4 shows a perspective view of a substrate for an integrally molded block.

FIG. 4 shows a perspective view of the substrate 210 for an integrally molded block 100. The substrate 210 comprises at least one opening 220 configured to receive an electrical contact 130. As shown in FIG. 4, the opening 220 can include a groove portion 226 and a center portion 222. The groove portion 226 forms a channel 228 extending from an outer edge 212 of the substrate 210 to the center portion 222 of the opening 220.

As shown in FIG. 4, the opening 220 can have a round, square, rectangular, oval, bone or butterfly shaped (as shown in FIG. 4) or any other desired shaped cross-section. The opening 220 and the electrical contact 130 form the socket 120 configured to receive an electrical connector 20 (not shown). For example, the electrical connector 20 can be a MINI-ROCKER® switch as manufactured and sold by Channell Commercial Corporation, Temecula, Calif., which allows the electrical connector 20 to be a multiple use assembly, rather than a single use assembly.

The center portion 222 of the opening 220 can further comprise a contact groove 224. The groove 224 is configured to position the electrical contact 130 within the opening 220 during the molding process. During the molding process, the electrical contact 130 is robotically positioned within the groove 224. At least one robotic device slides the electrical contact 130 through the channel 228 and positions the electrical contact 130 within the groove 224 of the opening 220.

In an alternative embodiment, the substrate 210 can further include a post 230. The post is positioned on an upper surface 214 of the substrate 210 in the vicinity of the groove 224. The electrical contact 130 is positioned within the groove 224 and wraps around the post 230. The post 230 is configured to assist the robotic device with the positioning of the electrical contact 130 within the groove 224 during the molding process.

Figure 5:
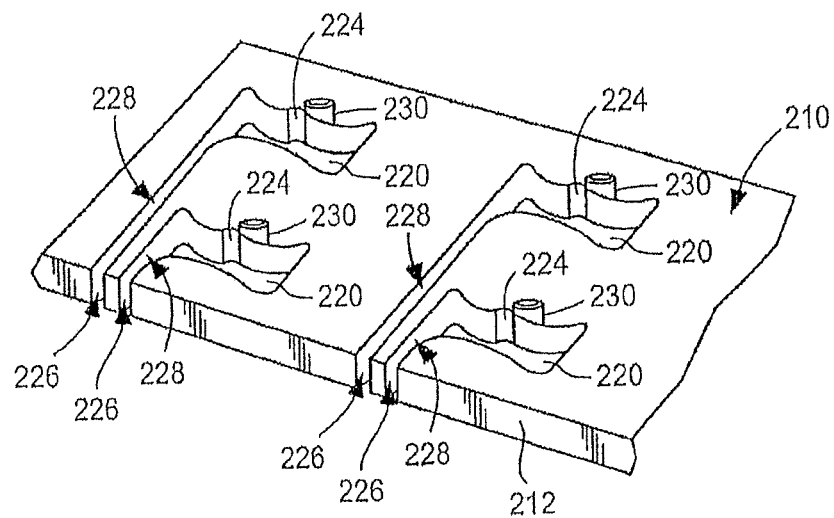
FIG. 5 shows a perspective view of a substrate having a plurality of openings for an integrally molded block.

FIG. 5 shows a perspective view of a substrate comprising a plurality of openings 220, wherein each opening 220 is configured to receive an electrical contact 130 preferably in the form of an electrical wire. As shown in FIG. 5, the substrate 210 comprises a plurality of openings 220 configured to receive at least one or a pair of electrical contacts 130. The plurality of openings 220 are preferably arranged in a symmetrical and uniform placement comprising rows of at least 2 openings per row and column, and more preferably 5 openings per row and column for a terminal block 10 having 25 or more openings 120.

The substrate 210 can comprise any number of configurations for receiving an electrical contact 130. For example, the substrate 210 can have a rectangular, circular, oval or square shape. In addition, the openings 220 can be configured in any number of rows and columns as long as each opening includes a channel 228, which extends from an outer edge 212 of the substrate 210. In addition, it can be appreciated that a plurality to substrates 210 can be stacked, tiered or cascaded on top of one another to form sockets on both the front side of the terminal block 10 as well as the back side of the terminal block 10.

FIG. 6 shows a perspective view of a substrate 210 for an integrally molded block wired with an electrical contact 130 in the form of an electrical wire 132. As shown in FIG. 6, the electrical contact 130 comprises an insulated electrical wire 132 having an electrical wire 134 and an insulated outer jacket 136. The electrical contact 130 can be secured to a back side 216 of the substrate 210 with an electrical contact retention member 240. The electrical retention member 240 can be an insulation displacement contact or IDC as known in the telecommunications industry. If the electrical retention member 240 is an IDC, the IDC serves as a means to cut the electrical wire 132 during wiring of the substrate 210.

As shown in FIG. 6, the insulated electrical wire 132 is positioned within the opening 220 of the substrate 210. One end of the insulated electrical wire 132 is wrapped around the post 230 and extends along a front side 214 of the substrate 210 to be gathered with other electrical wires 132 to form a pigtail. A pigtail as known in the telecommunications industry as a gathering of a plurality of insulated electrical wires 132. Meanwhile, the other end of the insulated electrical wire 132 is secured to a back side 216 of the substrate 210 by the retention member 240. It can be appreciated that the retention member 240 can be an insulation displacement contact or any other suitable device, which can cut or sever the electrical contact 130 on the back side 216 of the substrate 210.

The substrate 210 and the outer housing 170 are preferably comprised of a dielectric material. The dielectric material can be any type of dielectric polymer, conventional or otherwise depending on the desired dielectric properties of the material. In addition, the dielectric material should have a desired viscosity for injection of the dielectric material into the mold. It can be appreciated that the method and process allows for the use of dielectric materials that cannot be used with traditional potting compounds used in the hand poured gravity potting process.

The dielectric material is an insulator material, such as acrylonitrile butadiene styrene (ABS), polyolefin, polyurethanes, polyvinyl chloride, polystyrene, polycarbonates, polyesters, suitable plastics and desirable blends of the foregoing or other suitable materials. In one embodiment, the dielectric material is preferably is translucent to allow a telecommunications technician to trace the electrical wires 132 including color coded twisted copper wire pairs.

Figure 7:
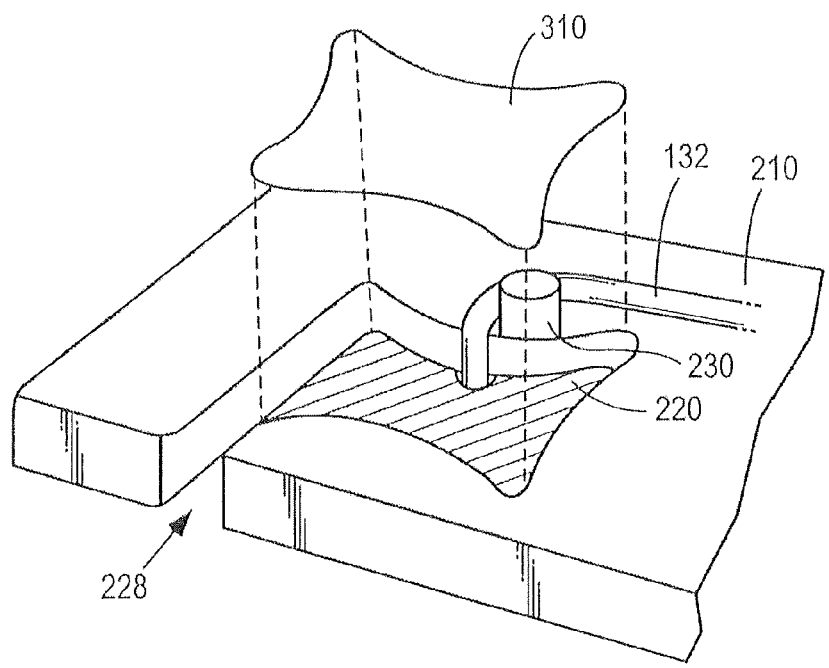
FIG. 7 shows a perspective view of a process of removing an outer jacket from the electrical contact.

FIG. 7 shows a perspective view of a process of removing the outer jacket 136 from an electrical wire 132. As shown in FIG. 7, the wired substrate 210 comprises an electrical wire 132 having an outer jacket 136 surrounding an electrical wire 134 is positioned within the opening 220 of the substrate 210. A projection tool 310 of the mold 300 (FIG. 10) extends from an upper surface 302 of the mold 300. As the mold 300 is closed, the projection tool 310 extends into the opening 220 of the substrate 210 and removes a portion of the outer jacket 136 of the insulated electrical wire 132 exposing the electrical wire 134. The dielectric material is then injected into the mold 300 forming the molded block 100. The projection tool 310 forms the socket 120 of the terminal block 10.

Figure 8:
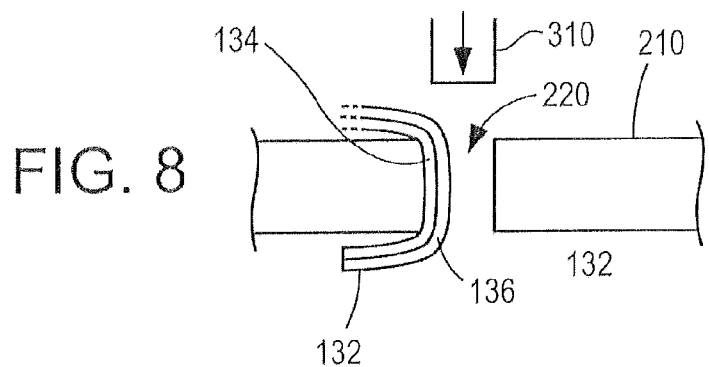
FIG. 8 shows a cross-sectional view of the process of removing the outer jacket from the electrical contact as shown in FIG. 7.

FIG. 8 shows a cross-sectional view of the process of removing the outer jacket 136 from the insulated electrical wire 132. As shown in FIG. 8, the projection tool 310 extends into the opening 220 of the substrate 210. The projection tool 310 has an approximate size and shape equal to the size and shape of the opening 220 of the substrate. As the projection tool 310 extends into the opening 220, as shown in FIG. 9, the outer jacket 136 of the electrical insulated wire 132 is removed exposing the electrical wire 134.

Figure 9:
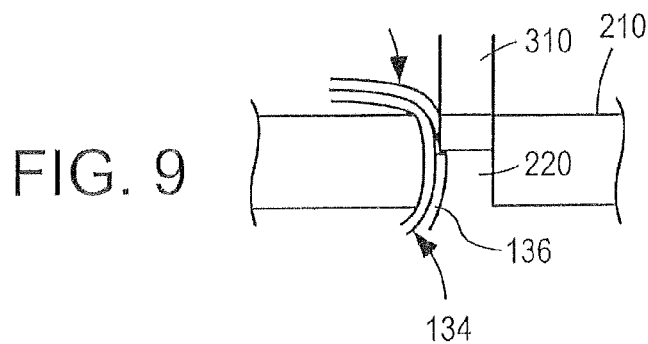
FIG. 9 shows another cross-sectional view of the process of removing the outer jacket from the electrical contact as shown in FIG. 7.

As shown in FIGS. 8 and 9, the wired substrate 210 is placed within a mold 300 and a projection 310 configured to remove a portion of the electrical insulation 134 from the electrical contact 130. The substrate 210 is wired as shown in FIG. 6 either within the mold 300 or alternatively the substrate 210 can be wired outside of the mold 300 and placed within the mold 200. The substrate 210 is placed in the mold 300 and as the mold 300 is closed, the projection tool 310 removes a portion of the electrical insulation or outer jacket 136 from the insulated electrical wire 132 to expose the electrical wire 134.

The electrical contact 130 is preferably an insulated electrical wire 132 comprising an outer jacket 136 of electrical insulation surrounding an electrically conductive wire 134. The electrically conductive wire 134 is preferably a copper wire, steel wire with a copper coating, or the like wherein the wire has electrically conductive properties. For example, the electrical wire 134 can be a 19 AWG to a 26 AWG gauge wire, and more preferably a 22 AWG gauge to a 24 AWG gauge wire. Alternatively, the electrical wires 134 can be Category 3, 5 or 6 wires/cables used in the transmission of broadband signals.

The outer jacket 136 of electrical insulation is preferably a plastic such as polyvinyl chloride (PVC) or a similar type of insulation material. If desired, the insulation material can be a paper or pulp like material. For example, typical plastics include PVC and plenum.

In one embodiment, the electrical contact 130 comprises a pair of twisted copper wires that are commonly used in the telephone industry. The pairs of copper insulated wires are typically found in groups of between 5 and 50 pairs, depending on the particular context in which they are to be used. Preferably, the pairs of insulated electrical wires are found in groups of 25 or less, and more preferably increments of 5, i.e. 5, 10, 15, 20, and 25, with groups of 25 being one of the most preferred embodiments.

Figure 10:
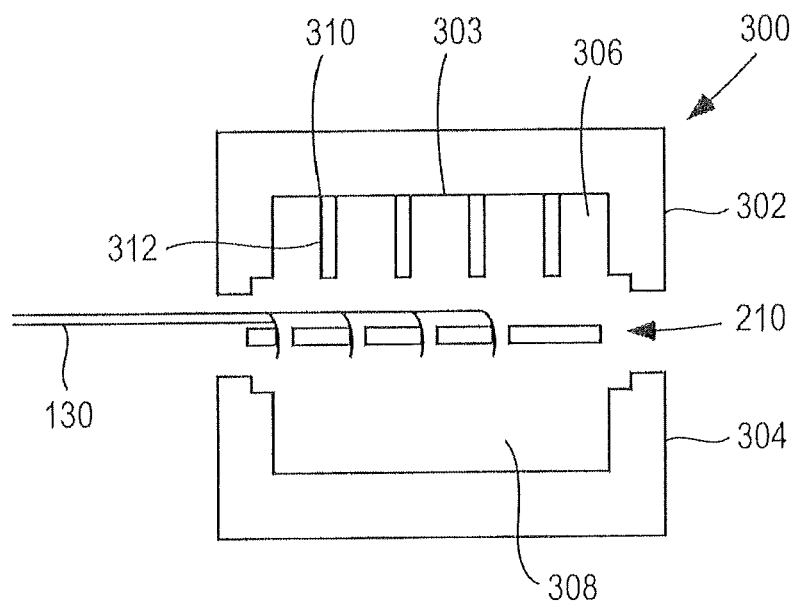
FIG. 10 shows a cross-sectional view of a mold for an integrally molded block.

FIG. 10 shows a cross-sectional view of a mold 300 for an integrally molded block 100. The mold 300 comprises an upper mold 302 and a lower mold 304. The upper mold 302 forms an upper mold cavity 306. The lower mold 304 forms a lower mold cavity 308. The mold 300 also includes a plurality of projection tools 310. As shown in FIGS. 7-9, the projections tool 310 removes a portion of the outer jacket 136 from the electrical contact 130 and also serves as a means for forming a socket 120 in the molded block 100.

The plurality of projection tools 310 extend from an inner surface 303 of the upper mold 302. The projection tool 310 can also include an electrical conductor having a means to verify that an electrical connection between the electrical contact 130 and the projection tool 310 is made prior to injection of the dielectric material into the mold. In addition, the projection tool 310 can test the electrical connection between the electrical contact 130 and the projection tool 310 after the dielectric material is injected into the mold 300.

As shown in FIG. 10, the integrally molded block 100 can be manufactured by placing the substrate 210 in the mold 300. The mold 300 is preferably an injection mold; however, it can be appreciated that the mold can be a compression mold, a transfer mold, or any other suitable mold. The substrate 210 preferably has at least one opening 220, and more preferably a plurality of openings 220 configured to receive an electrical contact 130.

In operation, a robotic means places one end of the electrical wire 132 through the groove 226 and the channel 228 of the substrate 210. Meanwhile, the other end of the electrical wire 132 is gathered to form a bundle of electrical wires 132.

As shown in FIG. 10, the mold 300 is preferably a two-piece mold comprising a first section 302 and a second section 304. The dielectric material is injected into the mold 300 with a gravitational force of at least 1 g. Preferably, the dielectric material is injected into the mold 300 by standard injection molding techniques to form the molded block 100. However, compression molding, transfer molding or any suitable molding method can be used to manufacture the block 100.

Since the dielectric material can be any type of dielectric polymer, conventional or otherwise depending, the method and process as described herein allows for the use of dielectric materials that cannot be used with traditional potting compounds used in the hand poured gravity potting process. For example the dielectric material can be selected from the group comprising acrylonitrile butadiene styrene (ABS), polyolefin, polyurethanes, polyvinyl chloride, polystyrene, polycarbonates, polyesters, suitable plastics and desirable blends of the foregoing or other suitable materials.

Preferably, the dielectric material and the composition of the electrical insulation 134 of the electrical wires are similar so that when the housing is molded it will chemically bond to the electrical insulation 134 increasing the integrity of the structure.

As set forth, the block 100 can be manufactured by a variety of pressure molding techniques, e.g. injection, compression, or transfer molding. The term "pressure molding" is intended to mean placement of the dielectric material by applying a force to the material of greater than 1 g. (i.e., the force of gravity). Injection molding will be in many cases the preferred pressure molding method and equipment used. However, other methods and equipment can be adapted to provide the pressure molding of the dielectric material according to this invention, such as centrifugal casting. In operation, the force or pressure can be applied directly to the dielectric material or indirectly such as vacuum forming which can provide a pressure on the material up to 1 atmosphere.

When heating, the time required for curing the dielectric material will preferably be short, generally from about 10 to about 20 minutes, depending upon the particular curing agent used in the dielectric material. Those of ordinary skill in the art relating to free radical curing agents for polymeric dielectric materials are conversant with adjustments of cure times and temperatures required to effect optimum results with any specific free radical agent.

For injection molding, the dielectric material is squirted into the mold 300 at controlled speeds, pressures and temperatures. Injection molding preferably comprises the following steps:

Step 1—The dielectric material is fed into the machine in the form of a continuous strip.

Step 2—The dielectric material is worked and warmed by an auger screw in a temperature-controlled barrel.

Step 3—As the dielectric material accumulates in the front of the screw, the screw is forced backwards. When the screw has moved back a specific amount, the machine is ready to make a shot.

Step 4—With the mold 300 held closed under hydraulic pressure, the screw is pushed forward. This forces the dielectric material into the mold 300, similar to the action of a hypodermic syringe.

Step 5—While the dielectric material cures in the heated mold, the screw turns again to refill the mold 300.

Step 6—The mold 300 opens and the block 100 can be removed. The machine is ready to make the next shot, as soon as the mold 300 closes.

It can be appreciated that a robotic device can be used to cut the electrical contacts 130 and gather the insulated electrical contacts 130 to form a cable.

Figure 11:
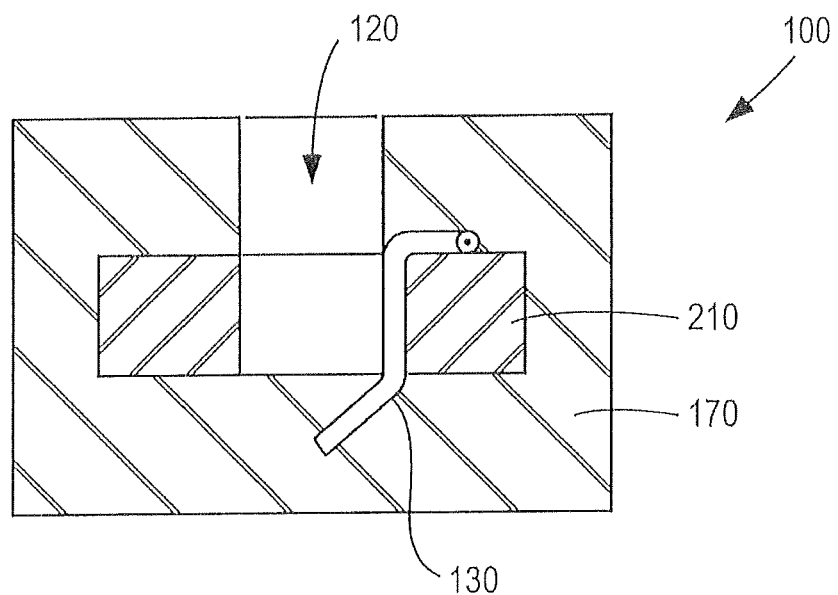
FIG. 11 shows a cross-sectional view of an integrally molded block.

FIG. 11 shows a cross section view of the molded block 100. The molded block 100 comprises an outer housing 170 formed of a dielectric material. The substrate 210 is encased in with the outer housing 170. The projection 310 forms a socket 120 within the outer housing 170. The socket 120 is configured to receive an electrical connector 20.

It can be appreciated that the molded block 100 can receive an electrical connector assembly 160 (FIGS. 12A and 12B) having a pair of wire receiving passages 162 movable between a first position in which a pair of wires are held apart from the second end and a second position in which a pair of wires are inserted into the second end.

Figure 12A:
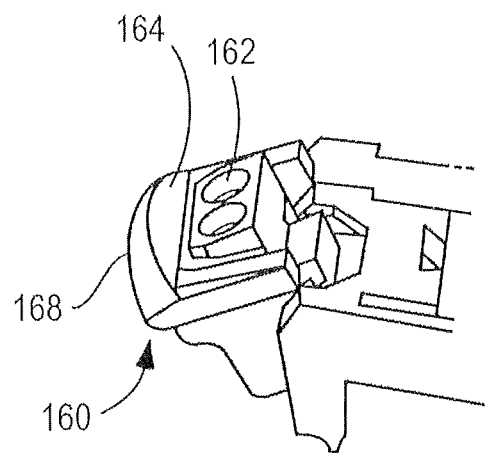
FIGS. 12A and 12B show a perspective view of a movable connector affixed to an end of an electrical connector.
Figure 12B:
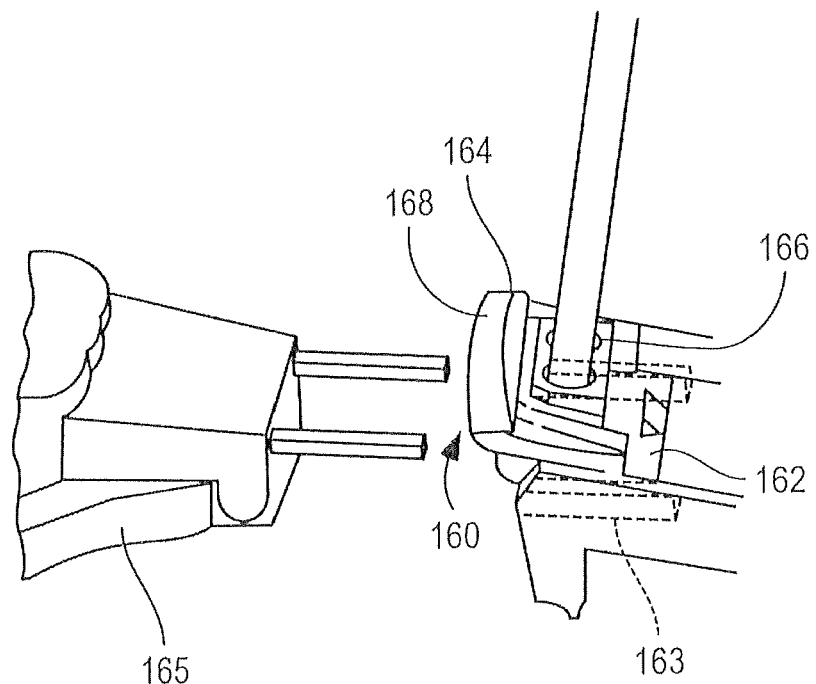

FIG. 12A shows a perspective view of an electrical connector 20 in the form of a connector assembly 160. In FIG. 12A, the connector assembly 160 is shown in a first position in which a pair of wires is held apart from the second end. FIG. 12B shows a perspective view of a connector assembly 160 in a second position in which a pair of wires is inserted into the second end.

The connector assembly 160 includes a body member 162 and a receptacle 164. The receptacle 164 including the pair of wire receiving passages 166. The wire receiving passages 166 being movable between the first position in which the wires are held apart from the second end and the second position in which the wires are inserted into the second end. The receptacle 164 can include a handle 168 adapted to move the wire receiving passages 166 to either the first or the second position. The connector assembly 160 is capable of removing the pair of wires from the second end and reinserting the pair of wires into the second end.

The second end of the multiple electrical connectors incorporating the connector assembly 160 preferably comprises insulation displacement contacts, positioned such that movement of the receptacle 164 to the second position causes an inserted wire to be engaged by the IDC connector. In addition, movement of the receptacle 164 back to the first position disengages the wire from the IDC connector. For example, the connector assembly 160 can be a MINI-ROCKER® switch as manufactured and sold by Channell Commercial Corporation, Temecula, Calif., which allows the connector assembly 160 to be a multiple use assembly, rather than a single use assembly.

In operation, a pair of wires is inserted into the wire receiving passages 166 in the first position where the wires are held apart from the second end. The technician grasps the handle 168 of the receptacle 164 and pushes the handle forward causing the wire receiving passages 166 and receptacle 164 to move to the second position. In the second position, the IDC connector engages the pair of wires. If the technician desires to remove the pair of wires from engagement with the IDC connector, the handle 168 of the receptacle 164 is pushed downward releasing the ends of the wires from engagement with the IDC connector. The pair of wires is then removed from the wire receiving passages 166. If re-entry is desired, the ends of the wire are preferably cut at a distance of about 10 mm and the wires are then re-inserted into the wire receiving passages 166. Alternatively, a second pair of wire can be re-inserted into the wire receiving passages 166 and pushing forward the handle 168 to engage the second pair of wires with the IDC connector.

In addition, the connector assembly 160 includes a test port 163 configured to receive a test clip 165. The test clip 165 allows the technician to test the terminal block 10 for electrical signals from the central office ("C.O.") and for service to the customer. If the technician wants to test only the central office line, the connector assembly 160 is placed in the first position in which the wires are held apart from the second end and the test clip 165 is inserted into the test port 163.

Alternatively, if the technician wants to test both the central office line and the outgoing service line to the customer, the connector 160 can be placed in the second position in which the wire are engaged with the IDC connector and the test clip 165 inserted into the test port 163.

The connector assembly 160 of the terminal block 10 can be entered substantially more than five times, preferably more than ten times and most preferably more than fifty times without loss of the weather resistance of the terminal block 10. Thus, in the preferred embodiments of the invention, the terminal block 10 alone, or when connected to a module, is weatherproof as defined by the majority, if not all, of the preceding weather related tests for use in harsh outside or buried environments.

Figure 13:
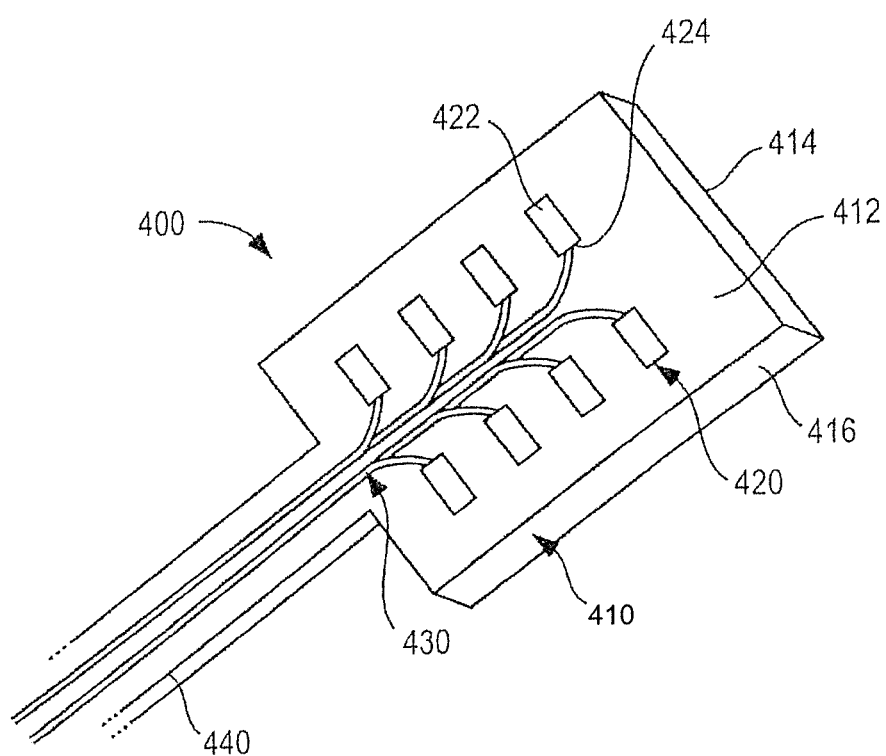
FIG. 13 shows a perspective view of another embodiment of a molded terminal block.

FIG. 13 shows a perspective view of a terminal block 100 for a telecommunication cable according to a further embodiment of the present invention. The terminal block 400 comprises a housing 410, multiple electrical connectors 420 and multiple pairs of electrical wires 430.

The housing 410 has a front side 412 and a backside 414 and adapted for receiving the end of a cable 440 comprising multiple pairs of insulated electrical wires 430. The multiple electrical connectors 420, each having a first end 422 and a second end 424 and positioned in the housing 410 and adapted to receive electrical wires 430 at the first end 422 in the back side 414 of the housing 410 and to receive electrical conductors in the front side 412 of the housing 410. The multiple pairs of electrical wires 430 extend from the cable 440 wherein the electrical wires 430 are connected to the first end 422 of the electrical connector 420 in the back side 414 of the housing 410. The first ends 422 of the electrical connectors 420 and the multiple pairs of electrical wires 430 connected thereto are embedded in a pressure molded dielectric material 416 in the backside 414 of the housing 410.

As shown in FIG. 13, the multiple electrical connectors 420 have a first end 422 and a second end 424. Preferably, the multiple electrical connectors 420 comprises a terminal end or first end 422 adapted to connect the multiple electrical wires 430 directly through the electrical insulation to form an electrical junction, and a contacting end or second end 424 on the multiple electrical connectors 420 adapted to connect the multiple electrical connectors 420 to an external member placed into engagement therewith.

The first end 422 preferably comprises a self-stripping slot configured to receive an end of an electrical wire, such as insulated telecommunications wire. The first end 422 can be an insulation displacement contact terminal (IDC) configured to receive an insulated wire or any other suitable connector adapted to receive an electrical wire. If the multiple electrical wires 430 are insulated wires, the first end 422 preferably pierces the insulation of the insulated wire, removing the insulation from the wire. The first and second ends 422, 424 are configured to electrically connect the multiple electrical connectors 420 to a telecommunications system.

In one embodiment, the multiple electrical connectors 420 are pairs of electrical connector members comprising a first end 422 and a second end 424, each end comprising an insulation displacement contact terminal configured to enable two wire pairs to be linked. Alternatively, the multiple electrical connectors 420 comprise a first end 422 and a second end 424, each end comprising a self-stripping slot formed therein configured to receive a wire having an insulation protective coating.

The first end 422 and the second end 424 of the multiple electrical connectors 420 can accept wires having a gauge of about 26 AWG to about 18½ AWG (about 0.4 to 0.9 mm). The outer diameter of the wires including insulation can be up to about 2.06 mm for standard telephone wires. However, it can be appreciated that the block 400 can be designed to accommodate wires having other gauges including Category 3, 5, and 6 broadband wires. In addition, the block 400 can be designed to accommodate wires of different gauges. For example, the first end 412 can accept a pair of wires having a 22 AWG gauge, while the second end 414 can accept a pair of wires having a 24 AWG gauge. Typical telecommunication wires are constructed of a soft copper insulated in an outer jacket of polyvinyl chloride.

In operation, the insulation displacement contact pierces the insulation of the insulated wire, which removes the insulation from the copper wire and makes electrical contact with the electrical wires.

In one embodiment, the multiple electrical connectors 420 comprise a first end 422 and a second end 424 having an insulation displacement contact (IDC) terminal at each end are inserted into the bore holes of the mold by a robotic device. Although any suitable IDC contact may be used, the IDC contacts preferably are capable of terminating a 19-26 AWG gauge wire, and more preferably a 22-24 AWG gauge wire. It can be appreciated that the multiple electrical connectors 420 can be any suitable electrical connector comprising a pair of termination points.

In operation, a mold 300 is filled with a dielectric material to provide environmental and mechanical protection for the multiple electrical connectors 420 and the multiple pairs of electrical wires 430. It should be appreciated by those skilled in the art that although the multiple electrical connectors 420 are shown as insulation displacement contacts, however any type of electrical connector or contact can be used with this method.

The terminal block 400 will preferably be manufactured by a process, wherein the dielectric material is injected into a mold 500 by a gravitational force of greater than 1 g. As set forth, the traditional methods and processes for manufacturing terminal block in the telecommunications industry require potting of the electrical connectors and the electrical wires by potting or pouring a potting compound over the electrical connectors and electrical wires at a gravitation force equal to 1 g.

Figure 14:
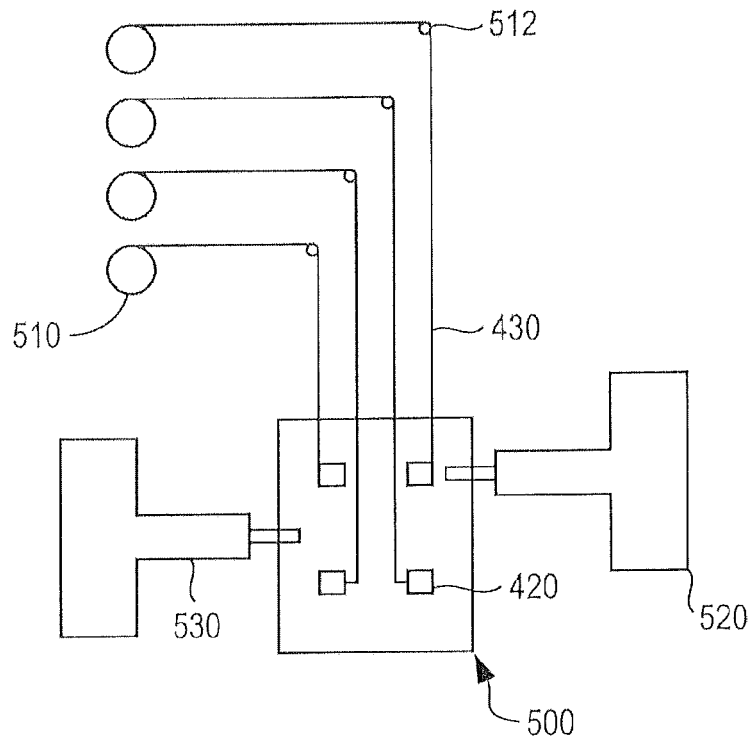
FIG. 14 shows a cross-sectional view of a method of manufacturing a terminal block according to one embodiment of the present invention.

FIG. 14 shows a cross-sectional view of a method of manufacturing a terminal block. The multiple electrical wires 430 preferably have a color-coded insulated jacket, which is fed from a spool of electrical wires 510 to a collection slot 512. The collection slot 512 directs the multiple pairs of electrical wires 430 to the mold 500, wherein a first robotic device 520 connects the multiple pairs of electrical wires 430 to the multiple electrical connectors 420. Prior to connecting the multiple pairs of electrical wires 430 to the multiple electrical connectors 420, the multiple electrical connectors 420 are positioned in the mold 500 by a second robotic device 530. It can be appreciated that a single robotic device can be used to position the multiple electrical connectors 420 in the mold 500 and to connect the multiple pairs of electrical wires 430 to the multiple electrical connectors 420.

Figure 15:
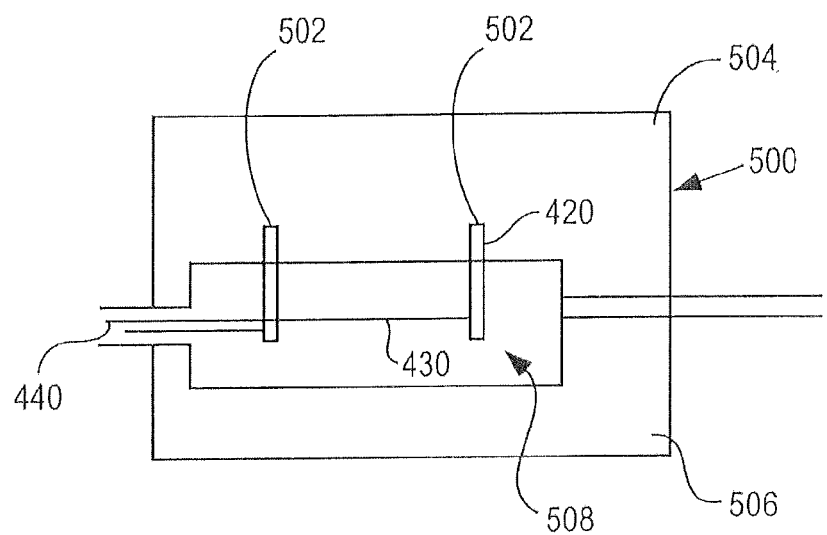
FIG. 15 shows a cross-sectional view of an injection mold for use in manufacturing a terminal block according to one embodiment of the present invention.

As shown in FIG. 15, the mold 500 comprises a plurality of slots 502 for positioning the multiple electrical connectors 420 within the mold 500. The plurality of slots 502 maintains the electrical connectors 420 in a prearranged spacing depending on the number of electrical connectors 420 positioned within the block 400.

The mold 500 is preferably a two-piece mold comprising a first section 504 and a second section 506 forming a cavity 508. The cavity 508 forms the outer surface of the terminal block 400. The dielectric material is injected into the mold 500 with a gravitational force of at least 1 g. Preferably, the dielectric material is injected into the mold 500 by standard injection molding techniques to form the block 400. However, compression molding, transfer molding or any suitable molding method can be used to manufacture the block 400.

In operation, the electrical insulation of the multiple pair of electrical wires 430 preferably has physical properties such that the electrical insulation has a higher melting temperature than the dielectric material.

Since the dielectric material can be any type of dielectric polymer, conventional or otherwise depending, the method and process as described herein allows for the use of dielectric materials that cannot be used with traditional potting compounds used in the hand poured gravity potting process.

It can be appreciated that a robotic device can be used to cut the multiple insulated electrical wires 430 and gather the multiple insulated electrical wires 430 to form a cable 440.

While this invention has been described with reference to the preferred embodiment described above, it will be appreciated that the configuration of this invention can be varied and that the scope of this invention is defined by the following claims.

The invention claimed is:

1. A method of manufacturing a terminal block for a telecommunication cable comprising:
   providing a housing having a front side and a back side and adapted for receiving the end of a cable comprising multiple pairs of electrical wires;
   positioning multiple pairs of electrical connectors in the housing such that one end of each of the electrical connectors is exposed on the front side of the housing and one end of the connector is exposed on the back side of the housing, and each of electrical connectors having an insulation displacement contact terminal on the end exposed on the back side of the housing;
   connecting multiple pairs of insulated electrical wires to the connectors on the back side of the housing, wherein an outer jacket of insulation from the multiple pairs of insulated electrical wires is removed to expose an individual wire contained therein by the insulation displacement contact terminal; and
   pressure molding a dielectric material on the back side of the housing to encapsulate the connections of the wires and the connectors on the back side of the housing.

2. The method of claim 1, comprising:
   aligning the insulated electrical wires and connecting the wires to the electrical connectors using a robotic apparatus.

3. The method of claim 1, comprising:
cutting a plurality of insulated electrical wires and gathering the plurality of insulated electrical wires to form the cable.

4. The method of claim 1, wherein the insulated electrical wires comprise soft copper wires having a gauge of about 19 AWG to about 26 AWG.

5. The method of claim 1, wherein the insulated electrical wires comprises an outer jacket of polyvinyl chloride.

6. The method of claim 1, wherein the dielectric material is acrylonitrile butadiene styrene (ABS).

7. The method of claim 1, wherein the insulated electrical wires are color-coded.

8. The method of claim 1, comprising:
supplying the multiple pairs of electrical connectors from a plurality of spools of insulated electrical wires.

9. The method of claim 1, further comprising:
a robotic apparatus adapted to connect the multiple pairs of insulated electrical wires to the multiple pairs of electrical connectors.

10. A method of manufacturing a terminal block for a telecommunication cable comprising:
providing a housing having a front side and a back side and adapted for receiving the end of a cable comprising multiple pairs of electrical wires;
positioning multiple pairs of electrical connectors in the housing such that one end of the connector is exposed on the front side of the housing and one end of the connector is exposed on the back side of the housing;
connecting multiple pairs of insulated electrical wires to the connectors on the back side of the housing;
pressure molding a dielectric material on the back side of the housing to encapsulate the connections of the wires and the connectors on the back side of the housing; and
connecting a moveable connector to the multiple pairs of electrical connectors on the front side of the housing after molding, the moveable connector comprising a pair of wire receiving passages movable between a first position in which a pair of wires are held apart from the second end and a second position in which the pair of wires are inserted into the second end, wherein the connector is capable of removing the pair of wires from the second end and reinserting the pair of wires into the second end.

11. The method of claim 10, comprising:
aligning the insulated electrical wires and connecting the wires to the electrical connectors to form an electrical connection between the electrical connector and the insulated electrical wires by a robotic apparatus.

12. The method of claim 10, comprising:
cutting a plurality of insulated electrical wires and gathering the plurality of insulated electrical wires to form the cable.

13. The method of claim 10, wherein the insulated electrical wires comprise soft copper wires having a gauge of about 19 AWG to about 26 AWG.

14. The method of claim 10, wherein the insulated electrical wires comprises an outer jacket of polyvinyl chloride.

15. The method of claim 10, wherein the dielectric material is acrylonitrile butadiene styrene (ABS).

16. The method of claim 10, wherein the insulated electrical wires are color-coded.

17. The method of claim 10, comprising:
supplying the multiple pairs of electrical connectors from a plurality of spools of insulated electrical wires.

18. The method of claim 10, comprising:
a robotic apparatus adapted to connect the multiple pairs of insulated electrical wires to the multiple pairs of electrical connectors.

\* \* \* \* \*